June 12, 1956     H. RICHTER     2,750,436
FLUID TIGHT CABLE ENTRY
Filed Aug. 14, 1952
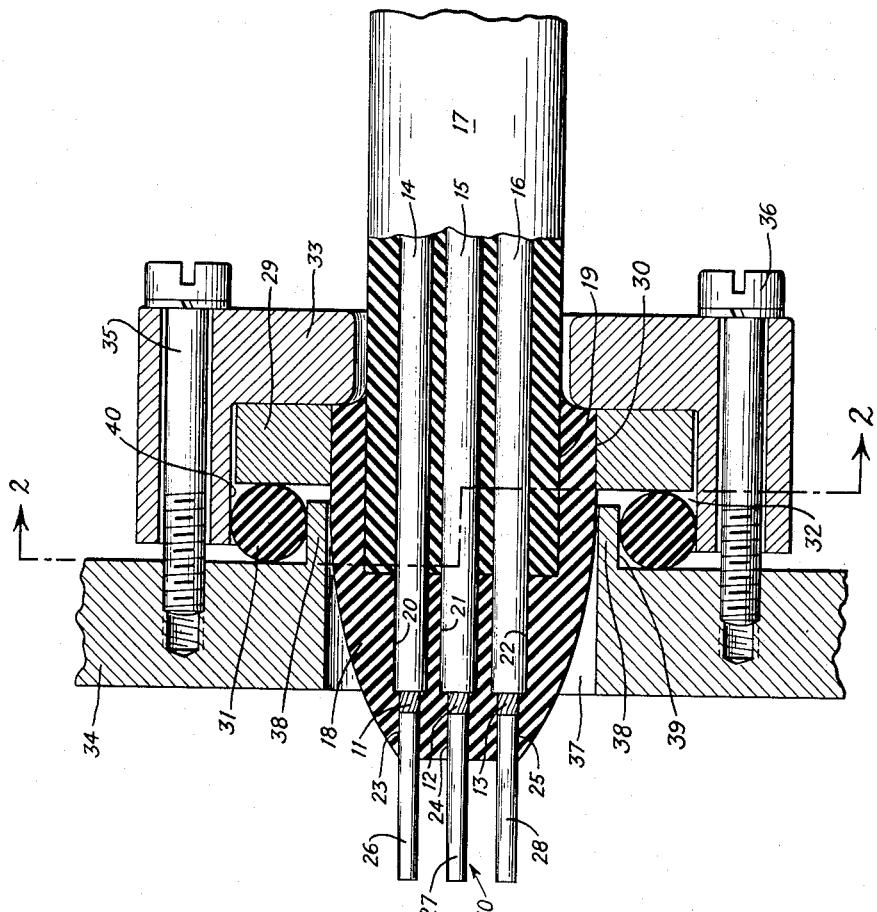
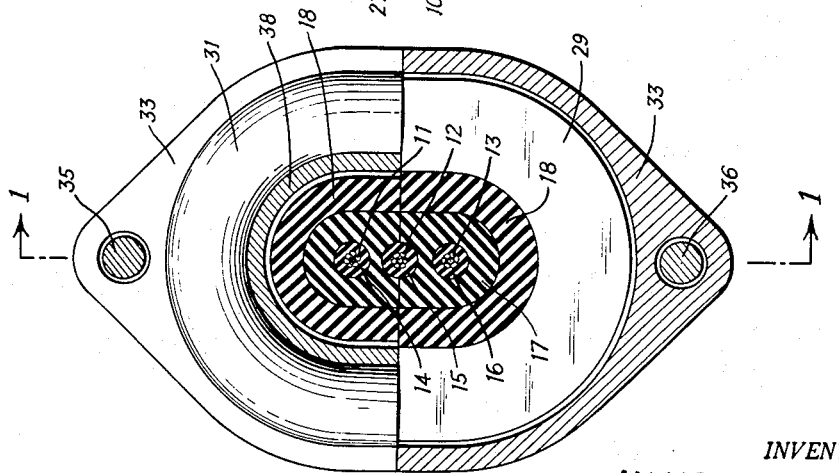
INVENTOR.
HANS RICHTER
BY
Howard G. Russell
his ATTORNEY

United States Patent Office 2,750,436
Patented June 12, 1956

2,750,436
FLUID TIGHT CABLE ENTRY

Hans Richter, West Dulwich, London, England, assignor to Eustace S. Dunn, Piedmont, Calif.

Application August 14, 1952, Serial No. 304,402

5 Claims. (Cl. 174—77)

This invention deals with the problem of introducing an electric cable into a sealed housing in such a way that the cable entry is effectively sealed against fluids under pressure and without likelihood of failure after a certain period after the initial installation.

The aforementioned problem is encountered for example in the installation and operation of motors operated in a fluid. Rather severe conditions must be met in the installation and operation of motors which form a part of a submersible well pump. Such pumps are, in effect, turbine pumps with a close coupled motor, both turbine and pump being installed near the bottom of the well. Installations are frequently made at a depth of the order of several thousand feet, and the fluid pressure which the cable entry must withstand are correspondingly high.

Difficulties arise in the construction of cable entries of the aforementioned character due to the fact that insulating materials tend to flow, creep or yield, if subjected to localized forces. For example it has been proposed to construct a cable entry for a multi-wire cable of the type in which each cable conductor has an insulating sheath, and all the insulating sheaths are enclosed within a jacket, by leading the cable through a hole in the motor housing large enough to accommodate the cable jacket together with a close fitting soft rubber ring at the point of entry. In the aforementioned installation, the rubber ring is longitudinally compressed along the cable, thereby expanding the ring outwardly against the hole in the wall, and inwardly against the cable jacket. The resulting seal is effective for a certain period of time. However, it is not dependable, since the inward pressure exerted against the cable jacket causes the jacket locally to creep longitudinally away from the ring, thereby reducing the pressure which the ring exerts both inwardly and outwardly. Eventually this pressure becomes insufficient to withstand the fluid pressure, and the cable entry leaks.

Entry of fluid into the motor housing, particularly the space occupied by the stator windings is quite serious and necessitates extensive repairs since the submersible pump, together with its cable and the long drop pipe leading to the surface, must be pulled from the well before repairs can be made.

The present invention provides a cable entry of improved construction. More particularly, the construction is such that the insulating covering, be it the conductor sheaths, or the insulating jacket, or both, are relieved from gasket pressures so that they will not creep, yield or flow. Cable entries embodying the present invention are admirably suited for cables having rubber insulation, as well as cables in which plastics are used as insulators or jacket, or both.

Also the improved construction is equally valuable for cables in which the sheathed conductors are enclosed in a jacket, as well as for cables in which the sheathed conductors are twisted to form a multi-wire cable.

The invention is equally adaptable to cables having conductors of the stranded type as well as cables having solid conductors.

These and other objects, features and advantages of the invention will appear more fully from the detailed description which follows accompanied by drawings, showing, for the purpose of illustration, a preferred embodiment of the invention. The invention also consists in certain new and original features of construction and combination of elements hereinafter set forth and claimed.

Although the characteristic features of this invention, which are believed to be novel will be particularly pointed out in the claims appended hereto, the invention itself, its objects and advantages, and the manner in which it may be carried out, may be better understood by referring to the following description taken in connection with the accompanying drawings forming a part of it in which:

Fig. 1 is a longitudinal section to a cable entry embodying the invention, the section being taken on line 1—1 of Fig. 2; and Fig. 2 is a cross-section taken on line 2—2 of Fig. 1.

In the following description and in the claims, various details will be identified by specific names for convenience. The names, however, are intended to be as generic as the part will permit. Corresponding reference numerals identify corresponding parts in the several figures of the drawings.

In the drawings accompanying, and forming part of the specification, certain specific disclosure of the invention is made for the purpose of explanation of broader aspects of the invention, but it is understood that the details may be modified in various respects without departure from the principles of the invention and that the invention may be applied to other structures than the ones shown.

Referring to the drawings, the illustrated cable 10 comprises three conductors 11, 12 and 13 enclosed in sheaths 14, 15 and 16. The insulating sheath may be made of any suitable insulating material, such as natural rubber, synthetic rubber, or any of the various non-rigid plastics which in recent years have increasingly taken the place of rubber. Such plastics include the vinyl and polyethylene groups.

The conductors 11, 12 and 13 are shown in the drawing as being of the stranded type, the illustrated cable being designed for flexing. However, the conductors may also be of the solid type in installations where little flexing occurs.

A jacket 17 of any suitable insulating material, such as natural rubber, synthetic rubber or a non-rigid plastic encloses the sheathed conductors and provides the usual outer protection.

An insulating cap 18 of any suitable insulating material such as natural rubber, synthetic rubber or a non-rigid plastic is securely bonded to the jacket at 19, to the sheaths at 20, 21 and 22, and to the conductors at 23, 24 and 25. The bond is produced according to the characteristics of the insulating material. In the case of rubber, this would be vulcanizing, and in the case of plastic, it is done by molding, the essential requirement being that the bond is secure and fluid tight.

In the event the conductors are solid, little difficulty is encountered in producing a bond between the cap and the conductors. However, in the case of a stranded conductor it is preferred first to solder the strands together as shown at 26, 27 and 28 so as to produce, in effect, solid conductors free from spaces between the individual strands through which fluid might leak.

A rigid flange 29 is bonded to the cap 18 at 30. This flange may be made of any suitable material. It may be metal, in which event an appropriate technique would be employed to bond the metal to the rubber or to the plastic of the cap 18, as the case may be. The flange 29 may also be made of a non-metallic material, for example hard rubber.

The flange 29 bears against a gasket 31 which may be made of rubber but may also be made of a plastic material, or even a metal such as lead. In the illustrated example a rubber gasket is shown which is an endless ring lying within an annular recess 32 of a yoke 33. The yoke is secured to the waterproof housing, more specifically the motor housing 34 by means of bolts 35 and 36. The housing has a hole 37 in it into which the front end of the cap 18 extends. An annular rim 38 around the hole provides an external surface 39 against which the gasket 31 may bear, if compressed.

When the bolts 35 and 36 are tightened, the flange 29 moves towards the housing wall 34 and causes the gasket to be compressed between the flange 29 and the wall 34, and between the internal surface 40 of the yoke and the external surface 39 of the rim, respectively. No forces, particularly no forces in a radial direction are exerted against either the cap 18 or the jacket 17, nor against the sheaths 14, 15 and 16 surrounding the conductors which would tend to cause the insulation to give way after some time due to the continued presence of the force. Thus, the cap, the jacket and the sheath serve as an enclosure apart from, and not affected by, compression of the sealing gasket 31.

The resulting seal is inexpensive to produce, simple to install and is altogether reliable, thereby eliminating the drawbacks of cable entries heretofore used.

What is claimed is:

1. The construction of a fluid and pressure tight cable entry for leading an insulated cable into a housing through a hole in a housing wall, the cable including at least one conductor, an insulating sheath surrounding the conductor and an insulating jacket surrounding the sheath, the construction comprising a cable in which the conductor is bared of, and extends beyond, the sheath and in which the sheath is bared of, and extends beyond, the jacket; a front cap of resilient insulating material bonded to and extending over, said conductor, said sheath and said jacket, said conductor projecting from said cap; a substantially radially extending rigid flange surrounding, and bonded to, said cap; a gasket between said wall and said flange; and means for compressing said gasket between said wall and said flange, the force of the compressed gasket acting on said flange substantially parallel to the cable axis, whereby the jacket is free from radially extending sealing forces which would tend to displace the jacket at the entry.

2. The construction of a fluid and pressure tight cable entry for leading an insulated cable into a housing through a hole in a housing wall, the cable including at least one conductor, an insulating sheath surrounding the conductor and an insulating jacket surrounding the sheath, the construction comprising a cable in which the conductor is bared of, and extends beyond, the sheath and in which the sheath is bared of, and extends beyond, the jacket; a front cap of resilient insulating material bonded to and extending over, said conductor, said sheath and said jacket, said conductor projecting from said cap; a substantially radially extending rigid flange surrounding, and bonded to, said cap; a gasket between said wall and said flange; and a yoke bearing on said flange for urging said flange towards the wall in a direction substantially parallel to the cable axis, thereby compressing said gasket in an axial direction.

3. The construction of a fluid and pressure tight cable entry for leading an insulated cable into a housing through a hole in a housing wall, the cable including a plurality of stranded conductors, an insulating sheath surrounding each conductor and an insulating jacket surrounding the sheaths, the construction comprising a cable in which the conductors are bared of, and extend beyond the respective sheaths, the projecting strands of each conductor being soldered together to form a solid conductor, and in which the sheaths are bared of, and extend beyond, the jacket; a front cap of resilient insulating material bonded to and extending over the soldered portions of said conductors, said bared sheaths and said jacket, said conductors projecting from said cap; a substantially radially extending rigid flange surrounding, and bonded to, said cap; a gasket between said wall and said flange; a yoke bearing on said flange for urging said flange towards the wall in a direction substantially parallel to the cable axis, thereby compressing said gasket in an axial direction; annular means for externally confining said gasket against outward expansion and annular means for internally confining said gasket against inward expansion against said cap.

4. The construction of a fluid and pressure tight cable entry for leading an insulated muti-conductor cable into a housing through a hole in a housing wall, the cable including at least two conductors, an insulating sheath surrounding each conductor, the construction comprising, a cable in which the ends of conductors are bared of and extend beyond, the respective sheaths; a front cap of resilient insulating material bonded to, and extending over, said conductors and said sheaths; a substantially radially extending rigid flange surrounding, and bonded to, said cap; a gasket between said wall and said flange; and means for compressing said gasket between said wall and said flange, the force of the compressed gasket acting on said flange substantially parallel to the cable axis, whereby the sheaths are not subjected to radially inwardly extending sealing force which would tend to displace the insulation at the entry.

5. The construction of a fluid and pressure tight cable entry for leading an insulated cable into a housing through a hole in a housing wall, the cable including at least one conductor, an insulating sheath surrounding the conductor and an insulating jacket surrounding the sheath, the construction comprising a cable in which the conductor is bared of, and extends beyond, the sheath and in which the sheath is bared of, and extends beyond, the jacket; a front cap of resilient insulating material bonded to and extending over, said conductor, said sheath and said jacket, said conductor projecting from said cap; a substantially radially extending rigid flange surrounding, and bonded to, said cap; a resilient O-ring between said wall and said flange; a yoke bearing on said flange for urging said flange towards said wall in a direction substantially parallel to the cable axis thereby compressing said O-ring in an axial direction, said yoke having a rim externally confining said O-ring against outward expansion; and an internal rim member between the O-ring and said cap for confining said O-ring against inward expansion.

References Cited in the file of this patent

UNITED STATES PATENTS

| | | |
|---|---|---|
| 2,055,622 | Coleman | Sept. 29, 1936 |
| 2,091,824 | Lewis | Aug. 31, 1937 |
| 2,396,702 | Johnson et al. | Mar. 19, 1946 |
| 2,524,534 | Morris et al. | Oct. 3, 1950 |
| 2,548,896 | Gutterman | Apr. 17, 1951 |
| 2,655,638 | Allen | Oct. 13, 1953 |